(12) United States Patent
Lee et al.

(10) Patent No.: US 12,288,647 B2
(45) Date of Patent: Apr. 29, 2025

(54) MULTILAYER CAPACITOR

(71) Applicant: SAMSUNG ELECTRO-MECHANICS CO., LTD., Suwon-si (KR)

(72) Inventors: Kangha Lee, Suwon-si (KR); Yoona Park, Suwon-si (KR); Jinsoo Park, Suwon-si (KR); Eun-Jin Kim, Suwon-si (KR); Yeon Song Kang, Suwon-si (KR); Myung Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 413 days.

(21) Appl. No.: 17/733,072

(22) Filed: Apr. 29, 2022

(65) Prior Publication Data

US 2022/0392707 A1   Dec. 8, 2022

(30) Foreign Application Priority Data

Jun. 3, 2021   (KR) .................. 10-2021-0071974

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC ............. *H01G 4/30* (2013.01); *H01G 4/008* (2013.01); *H01G 4/012* (2013.01); *H01G 4/12* (2013.01)

(58) Field of Classification Search
CPC .......... H01G 4/008; H01G 4/012; H01G 4/12; H01G 4/232; H01G 4/2325; H01G 4/30
See application file for complete search history.

(56) References Cited

U.S. PATENT DOCUMENTS

| | | | |
|---|---|---|---|
| 2015/0162132 A1 | 6/2015 | Kwag et al. | |
| 2019/0392991 A1* | 12/2019 | Harada | ................. H01G 4/228 |
| 2020/0273621 A1 | 8/2020 | Yi et al. | |
| 2021/0057154 A1* | 2/2021 | Zenzai | ................. H01G 4/232 |

FOREIGN PATENT DOCUMENTS

| | | |
|---|---|---|
| KR | 10-2010-0020314 A | 2/2010 |
| KR | 10-2004776 B1 | 7/2019 |
| KR | 10-2020-0102319 A | 8/2020 |

* cited by examiner

*Primary Examiner* — Nathan Milakovich
(74) *Attorney, Agent, or Firm* — MORGAN, LEWIS & BOCKIUS LLP

(57) ABSTRACT

A multilayer capacitor includes a capacitor body including an active region having a dielectric layer, and first and second internal electrodes, and an upper cover region and a lower cover region respectively disposed above and below the active region, and including first to sixth surfaces; and first and second external electrodes disposed on both end portions of the capacitor body in the second direction, respectively, and connected to the first and second internal electrodes, respectively. The first and second external electrodes include first and second conductive layers disposed on the third and fourth surfaces, respectively; first and second conductive resin layers disposed on the first and second conductive layers, respectively; and first and second plating layers disposed on the first and second conductive resin layers, respectively, and contacting the first and second conductive layers in the upper or lower cover region, respectively.

18 Claims, 5 Drawing Sheets

I-I'

A

B

MULTILAYER CAPACITOR

CROSS-REFERENCE TO RELATED APPLICATION(S)

This application claims benefit of priority to Korean Patent Application No. 10-2021-0071974 filed on Jun. 3, 2021 in the Korean Intellectual Property Office, the disclosure of which is incorporated herein by reference in its entirety.

TECHNICAL FIELD

The present disclosure relates to a multilayer capacitor.

BACKGROUND

With the recent miniaturization and implementation of high-functionality in IT products, multilayer capacitors used in IT products are also being required to be miniaturized and to have high capacity.

In addition, with the increase in technological capabilities and demand for foldable smartphones and wearable devices, flexural strength characteristics mainly required for multilayer capacitors for use in the vehicle electrics/electronics field are also required for multilayer capacitors for use in the IT field.

Therefore, for stable operations of next-generation IT devices, multilayer capacitors for guaranteeing flexural strength while having a minimum thickness and high capacitance are required.

SUMMARY

An aspect of the present disclosure is to provide a multilayer capacitor for reducing a thickness thereof and guaranteeing flexural strength thereof.

According to an aspect of the present disclosure, a multilayer capacitor includes a capacitor body including an active region having a dielectric layer, a first internal electrode, and a second internal electrode, and an upper cover region and a lower cover region respectively disposed above and below the active region, and including a first surface and a second surface, opposing each other in a first direction, a third surface and a fourth surface, opposing each other in a second direction, different from the first direction, and a fifth surface and a sixth surface, opposing each other in a third direction, different from the first direction; and a first external electrode and a second external electrode respectively disposed on end portions of the capacitor body in the second direction and respectively connected to the first and second internal electrodes. The first external electrode includes a first conductive layer disposed on the third surface of the capacitor body to be connected to the first internal electrode; a first conductive resin layer disposed on the first conductive layer and disposed on portions of the first, second, fifth, and sixth surfaces of the capacitor body; and a first plating layer disposed on the first conductive resin layer and contacting the first conductive layer in the upper or lower cover region. The second external electrode includes a second conductive layer disposed on the fourth surface of the capacitor body to be connected to the second internal electrode; a second conductive resin layer disposed on the second conductive layer and disposed on portions of the first, second, fifth, and sixth surfaces of the capacitor body; and a second plating layer disposed on the second conductive resin layer and contacting the second conductive layer in the upper or lower cover region.

In an embodiment of the present disclosure, the first conductive layer and the first plating layer may be in contact with each other, on a portion of the capacitor body to which the third surface and the first or second surface are connected, and the second conductive layer and the second plating layer may be in contact with each other, on a portion of the capacitor body to which the fourth surface and the first or second surface are connected.

In an embodiment of the present disclosure, the first conductive layer may include a first inner conductive layer disposed on the third surface of the capacitor body, and a first outer conductive layer disposed on the first inner conductive layer, and the second conductive layer may include a second inner conductive layer disposed on the fourth surface of the capacitor body, and a second outer conductive layer disposed on the second inner conductive layer.

In an embodiment of the present disclosure, the first and second conductive layers may include at least one of copper (Cu), nickel (Ni), tin (Sn), or silver (Ag).

In an embodiment of the present disclosure, in the first conductive layer, a metal component included in the first inner conductive layer may be different from a metal component included in the first outer conductive layer, and in the second conductive layer, a metal component included in the second inner conductive layer may be different from a metal component included in the second outer conductive layer.

In an embodiment of the present disclosure, the first conductive resin layer may include a 1-1 conductive resin layer and a 1-2 conductive resin layer, the second conductive resin layer may include a 2-1 conductive resin layer and a 2-2 conductive resin layer, the first plating layer may include a 1-1 plating layer and a 1-2 plating layer, and the second plating layer may include a 2-1 plating layer and a 2-2 plating layer. The first external electrode may include a first connection portion disposed on the third surface of the capacitor body, and a first band portion extending from the first connection portion toward portions of the first, second, fifth, and sixth surfaces of the capacitor body. The first connection portion may include the first conductive layer, the 1-1 conductive resin layer disposed on the first conductive layer, and the 1-1 plating layer disposed on the 1-1 conductive resin layer. The first band portion may include the 1-2 conductive resin layer disposed on portions of the first, second, fifth, and sixth surfaces of the capacitor body, and the 1-2 plating layer extending from the 1-1 plating layer to cover the 1-2 conductive resin layer. The second external electrode may include a second connection portion disposed on the fourth surface of the capacitor body, and a second band portion extending from the second connection portion toward portions of the first, second, fifth, and sixth surfaces of the capacitor body. The second connection portion may include the second conductive layer, the 2-1 conductive resin layer disposed on the second conductive layer, and the 2-1 plating layer disposed on the 2-1 conductive resin layer. The second band portion may include the 2-2 conductive resin layer disposed on portions of the first, second, fifth, and sixth surfaces of the capacitor body, and the 2-2 plating layer extending from the 2-1 plating layer to cover the 2-2 conductive resin layer.

In an embodiment of the present disclosure, a maximum thickness of the 1-2 conductive resin layer may be less than a sum of a maximum thickness of the 1-1 conductive resin layer and a maximum thickness of the first conductive layer, and a maximum thickness of the 2-2 conductive resin layer may be less than a sum of a maximum thickness of the 2-1 conductive resin layer and a maximum thickness of the second conductive layer.

In an embodiment of the present disclosure, the first and second conductive resin layers may include a metal particle and a resin.

In an embodiment of the present disclosure, the first and second plating layers may be nickel (Ni) plating layers, and the first and second external electrodes may further include a third plating layer and a fourth plating layer respectively disposed on the first and second plating layers and provided as a tin (Sn) plating layer.

According to another aspect of the present disclosure, a multilayer capacitor includes a capacitor body including a dielectric layer, a first internal electrode, and a second internal electrode, and including a first surface and a second surface, opposing each other in a first direction, a third surface and a fourth surface, opposing each other in a second direction, different from the first direction, and a fifth surface and a sixth surface, opposing each other in a third direction, different from the first direction; and a first external electrode and a second external electrode respectively disposed on end portions of the capacitor body in the second direction and respectively connected to the first and second internal electrodes. The first external electrode includes a first conductive layer disposed on the third surface of the capacitor body to be connected to the first internal electrode, and a first conductive resin layer covering the first conductive layer and disposed on portions of the first, second, fifth, and sixth surfaces of the capacitor body. The second external electrode includes a second conductive layer disposed on the fourth surface of the capacitor body to be connected to the second internal electrode, and a second conductive resin layer covering the second conductive layer and disposed on portions of the first, second, fifth, and sixth surfaces of the capacitor body. A portion of the third surface of the capacitor body between an internal electrode located in an uppermost portion of the capacitor body and an internal electrode located in a lowermost portion of the capacitor body is equally divided into four sections in the first direction. First to fifth points are each boundary points of the four sections on the third surface of the capacitor body. A ratio of a thickness of the first conductive resin layer relative to a thickness of the first conductive layer is 0.25 or less at the first and fifth points, respectively, 0.3 or less at the second and fourth points, respectively, and 0.35 or less at the third point.

In an embodiment of the present disclosure, the first conductive layer of the first external electrode may have an average thickness of 12 μm or less at the first and fifth points, and an average thickness of 15 μm or less at the second to fourth points.

In an embodiment of the present disclosure, a portion of the fourth surface of the capacitor body between an internal electrode located in an uppermost portion of the capacitor body and an internal electrode located in a lowermost portion of the capacitor body is equally divided into four sections in the first direction. Sixth to tenth points are each boundary points of the four sections on the fourth surface of the capacitor body. A ratio of a thickness of the second conductive resin layer relative to a thickness of the second conductive layer may be 0.25 or less at the sixth and tenth points, respectively, 0.3 or less at the seventh and ninth points, respectively, and 0.35 or less at the eighth point.

In an embodiment of the present disclosure, the second conductive layer of the second external electrode may have an average thickness of 12 μm or less at the sixth and tenth points, and an average thickness of 15 μm or less at the seventh to ninth points.

In an embodiment of the present disclosure, the multilayer capacitor may further include a first plating layer and a second plating layer respectively disposed on the first and second conductive resin layers.

According to another aspect of the present disclosure, a multilayer capacitor includes a capacitor body including an active region having a dielectric layer and first and second internal electrodes, and an upper cover region and a lower cover region respectively disposed above and below the active region; and first and second external electrodes connected to the first and second internal electrodes, respectively. The first external electrode includes: a first conductive layer disposed on an end surface of the capacitor body to cover an end of the first internal electrode; a first conductive resin layer including a first portion disposed on the first conducive layer and a second portion disposed on a side surface of the capacitor body; and a first plating layer including a third portion disposed on the first portion of the first conductive resin layer and a fourth portion disposed on the second portion of the first conductive resin layer. The first plating layer has a portion disposed in an opening of the first conductive resin layer between the first and second portions of the first conductive resin layer to connect to the first conductive layer.

In an embodiment of the present disclosure, a portion of the first conductive layer in contact with one of the upper cover region and the lower cover region may also be in contact with the portion of the first plating layer disposed in the opening of the first conductive resin layer.

According to another aspect of the present disclosure, a multilayer capacitor includes a capacitor body including an active region having a dielectric layer, and first and second internal electrodes, and an upper cover region and a lower cover region respectively disposed above and below the active region, and including a first surface and a second surface, opposing each other in a first direction, a third surface and a fourth surface, opposing each other in a second direction different from the first direction, and a fifth surface and a sixth surface, opposing each other in a third direction different from the first direction; and first and second external electrodes disposed on the third and fourth surfaces, respectively, and connected to the first and second internal electrodes, respectively. The first external electrode includes a first conductive layer disposed on the third surface of the capacitor body to cover an end of the first internal electrode; and a first conductive resin layer including a first portion disposed on the first conducive layer and a second portion disposed on at least one of the first and second surfaces of the capacitor body. A thickness of the second portion of the first conductive resin layer at an intermediate point on the one of the first and second surfaces in the second direction is less than a total thickness of the conductive layer and the first portion of the conductive resin layer at an intermediate point on the third surface in the first direction. At the intermediate point on the third surface in the first direction, a thickness of the conductive layer is greater than a thickness of the first portion of the conductive resin layer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
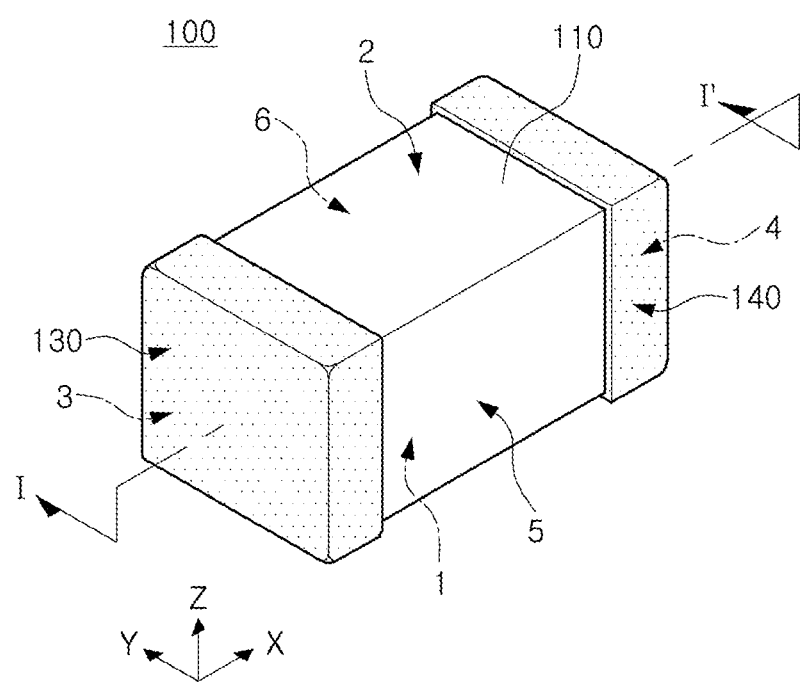
FIG. 1 is a perspective view schematically illustrating a multilayer capacitor according to an embodiment of the present disclosure.

Hereinafter, preferred embodiments of the present disclosure will be described with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity.

Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

Hereinafter, when defining directions of a capacitor body 110 in order to clearly describe an embodiment of the present disclosure, X, Y, and Z illustrated in the drawings indicates a length direction, a width direction, and a thickness direction of the capacitor body 110, respectively.

Also, in the present embodiment, the Z direction may be used as the same concept as a stacking direction in which dielectric layers 111 are stacked.

Also, in the present embodiment, the X, Y, and Z directions may be defined as second, third, and first directions, respectively.

Figure 2A:
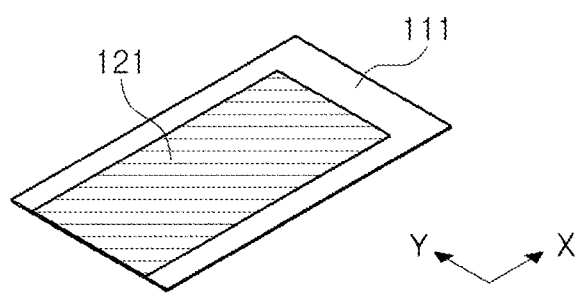
FIGS. 2A and 2B are exploded perspective views respectively illustrating first and second internal electrodes applied to the multilayer capacitor of FIG. 1.
Figure 2B:
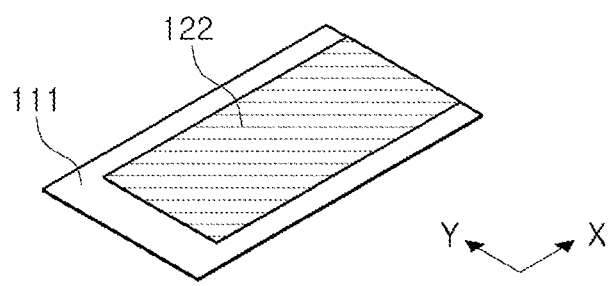
Figure 3:
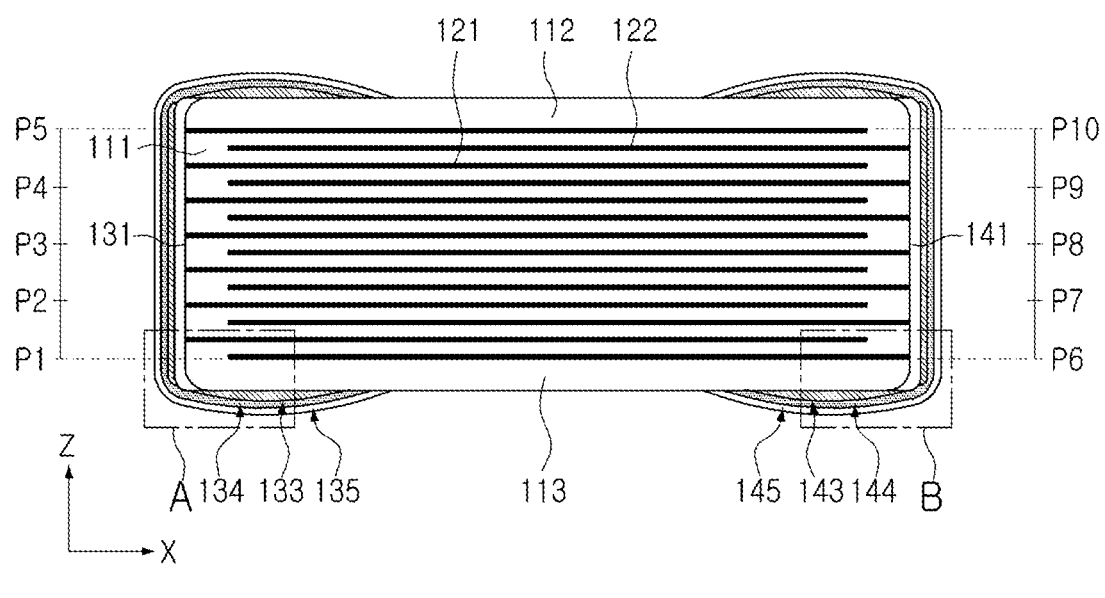
FIG. 3 is a cross-sectional view of FIG. 1, taken along line I-I'.
Figure 4:
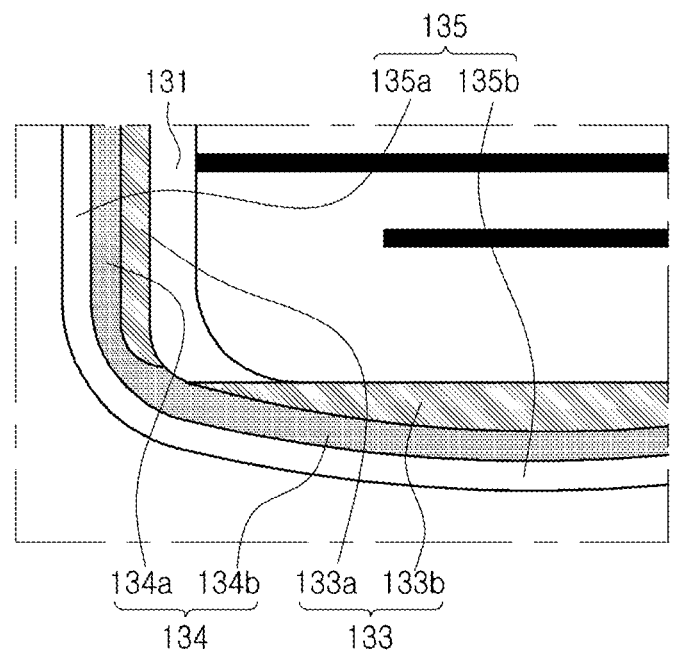
FIG. 4 illustrates enlarged views of portions A and B of FIG. 3.
Figure 4:
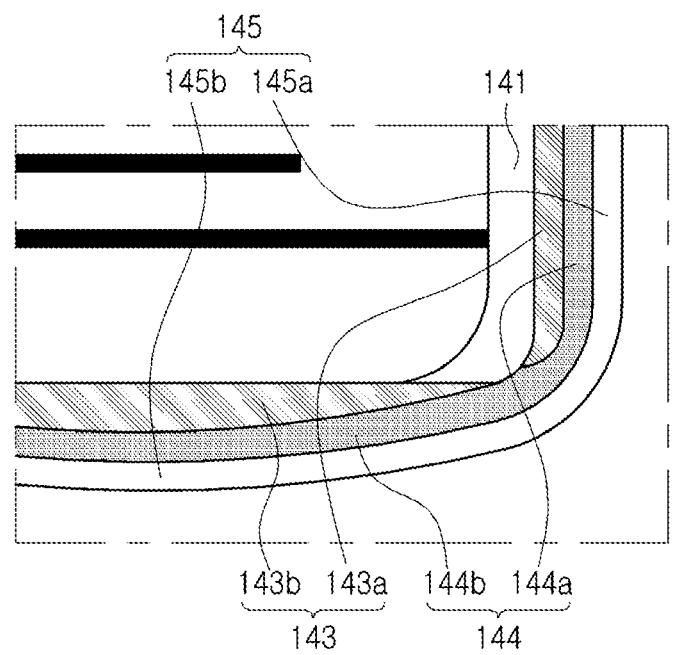

FIG. 1 is a perspective view schematically illustrating a multilayer capacitor according to an embodiment of the present disclosure, FIGS. 2A and 2B are exploded perspective views respectively illustrating first and second internal electrodes applied to the multilayer capacitor of FIG. 1, FIG. 3 is a cross-sectional view of FIG. 1, and FIG. 4 illustrates enlarged views of portions A and B of FIG. 3.

Referring to FIGS. 1 to 4, a multilayer capacitor 100 according to the present embodiment may include a capacitor body 110 and first and second external electrodes 130 and 140.

The capacitor body 110 may be obtained by stacking a plurality of dielectric layers 111 in the Z direction and then firing them. A boundary between the dielectric layers 111 adjacent to each other in the capacitor body 110 may be integrated such that it may be difficult to identify the boundary without using a scanning electron microscope (SEM).

In this case, the capacitor body 110 may have a generally hexahedral shape, but the present disclosure is not limited thereto. In addition, a shape and dimensions of the capacitor body 110, and the number of stacked layers of the dielectric layer 111 are not limited to those illustrated in the drawings of the present embodiment.

In the present embodiment, for convenience of explanation, both surfaces of the capacitor body 110 opposing each other in the Z direction are defined as first and second surfaces 1 and 2, both surfaces connected to the first and second surfaces 1 and 2 and opposing each other in the X direction, perpendicular to the Z direction, are defined as third and fourth surfaces 3 and 4, and both surfaces connected to the first and second surfaces 1 and 2, connected to the third and fourth surfaces 3 and 4, and opposing each other in the Y direction, perpendicular to the Z direction, are defined as fifth and sixth surfaces 5 and 6.

In addition, in the present embodiment, a mounting surface of the multilayer capacitor 100 may be the first surface 1 of the capacitor body 110.

The dielectric layer 111 may include a ceramic material having a high dielectric constant, for example, a barium titanate ($BaTiO_3$)-based ceramic powder, a strontium titanate ($SrTiO_3$)-based ceramic powder, or the like, but is not limited thereto, as long as the dielectric layer 111 has sufficient capacitance.

Further, a ceramic additive, an organic solvent, a plasticizer, a binder, a dispersant, and the like may be further added to the dielectric layer 111, together with the ceramic powder.

As the ceramic additive, for example, a transition metal oxide or a transition metal carbide, a rare earth element, magnesium (Mg), aluminum (Al), or the like may be used.

The capacitor body 110 may include an active region including a dielectric layer 111 and first and second internal electrodes 121 and 122 and serving as a portion contributing to capacitance formation of the capacitor, and upper and lower covers 112 and 113 respectively formed above and below the active region in the Z direction as upper and lower margin portions.

The upper and lower covers 112 and 113 may have the same material and configuration as the dielectric layer 111, except that they do not include internal electrodes.

The upper and lower covers 112 and 113 may be formed by stacking a single dielectric layer or two or more dielectric layers above and below the active region in the Z direction, respectively, and may basically serve to prevent first and second internal electrodes 121 and 122 from being damaged by physical or chemical stress.

The first and second internal electrodes 121 and 122 may be electrodes to which different polarities are applied, may be alternately arranged in the Z direction with the dielectric layer 111 interposed therebetween, and may be configured such that one ends thereof are exposed through (extending from or in contact with) the third and fourth surfaces 3 and 4 of the capacitor body 110, respectively.

In this case, the first and second internal electrodes 121 and 122 may be electrically insulated from each other by the dielectric layer 111 interposed therebetween.

End portions of the first and second internal electrodes 121 and 122 alternately exposed from the third and fourth surfaces 3 and 4 of the capacitor body 110 may be in contact with and may be electrically connected to the first and second external electrodes 130 and 140 arranged on the third and fourth surfaces 3 and 4 of the capacitor body 110, respectively, to be described later.

According to the above configuration, when a predetermined voltage is applied to the first and second external electrodes 130 and 140, electric charges may be accumulated between the first and second internal electrodes 121 and 122.

In this case, capacitance of the multilayer capacitor 100 may be proportional to an area of overlap between the first and second internal electrodes 121 and 122, which overlap each other in the active region in the Z direction.

In addition, materials for forming the first and second internal electrodes 121 and 122 are not particularly limited, and may be formed using a noble metal material such as platinum (Pt), palladium (Pd), and palladium-silver (Pd—Ag) alloy, and the like, and a conductive paste made of one or more materials of nickel (Ni) and copper (Cu).

In this case, a method of printing the conductive paste may use a screen-printing method, a gravure printing method, or the like, but the present disclosure is not limited thereto.

The first external electrode 130 may be disposed on one end portion of the capacitor body 110 in the X direction, and may include a first conductive layer 131, a first conductive resin layer 133, and a first plating layer 134.

The first conductive layer 131 may be disposed only on the third surface 3 of the capacitor body 110 to prevent bending cracks, and may be electrically connected to an exposed portion of the first internal electrode 121.

In this case, the first conductive layer 131 may not be formed on the first, second, fifth, and sixth surfaces 1, 2, 5, and 6 of the capacitor body 110.

In addition, the first conductive layer 131 may be a base electrode formed as a sintered electrode layer, may include at least one of metals such as copper (Cu), nickel (Ni), silver (Ag), tin (Sn), or the like, and may further include glass or the like, in addition thereto.

The first plating layer 134 may be disposed on the one end portion of the capacitor body 110 to cover the first conductive resin layer 133.

In this case, the first plating layer 134 may have a portion directly contacting a portion of the first conductive layer 131 in the upper or lower cover region 112 or 113 of the capacitor body 110.

In addition, the first plating layer 134 may be formed as a nickel (Ni) plating layer, and a third plating layer 135 may be further disposed on the first plating layer 134. In this case, the third plating layer 135 may be formed as a tin (Sn) plating layer.

The first conductive resin layer 133 may be disposed on the first conductive layer 131 on the one end portion of the capacitor body 110.

In this case, the first conductive resin layer 133 may not be formed in a region in which the third surface 3 and the first or second surface 1 or 2 of the capacitor body 110 are connected in the upper or lower cover region 112 or 113 of the capacitor body 110, to provide a non-formed portion. In the non-formed portion in which the first conductive resin layer 133 is not formed, a portion of the first conductive layer 131 may be in direct contact with the first plating layer 134.

With this structure, the first conductive resin layer 133 may include a 1-1 conductive resin layer 133a disposed on the first conductive layer 131, and a 1-2 conductive resin layer 133b disposed on portions of the first, second, fifth, and sixth surfaces 1, 2, 5, and 6 of the capacitor body 110. An opening (or a gap) may be provided between the 1-1 conductive resin layer 133a and the 1-2 conductive resin layer 133b, so that the first plating layer 134 may include a portion disposed in the opening of the first conductive resin layer 133 between the 1-1 conductive resin layer 133a and the 1-2 conductive resin layer 133b to be in contact with to the first conductive layer 131.

In addition, the first conductive resin layer 133 may include a plurality of metal particles, and a resin surrounding the plurality of metal particles and contacting the first conductive layer 131.

In this case, the metal particles may be made of an alloy of at least one or two or more of copper (Cu), silver (Ag), and tin (Sn), but the present disclosure is not limited thereto.

In addition, the metal particles may be formed to have a spherical shape or a flake shape, but the present disclosure is not limited thereto.

In addition, the resin may be one of polymer resins such as epoxy, acryl, or the like, but the present disclosure is not limited thereto.

The second external electrode 140 may receive a voltage having a polarity, different from that of the first external electrode 130, may be disposed at the other end portion of the capacitor body 110 in the X direction, and may include a second conductive layer 141, a second conductive resin layer 143, and a second plating layer 144.

The second conductive layer 141 may be formed only on the fourth surface 4 of the capacitor body 110 to prevent bending cracks, and may be electrically connected to an exposed portion of the second internal electrode 122.

In this case, the second conductive layer 141 may not be formed on the first, second, fifth, and sixth surfaces 1, 2, 5, and 6 of the capacitor body 110.

In addition, the second conductive layer 141 may be a base electrode formed as a sintered electrode layer, may include at least one of metals such as copper (Cu), nickel (Ni), silver (Ag), tin (Sn), or the like, and may further include glass or the like, in addition thereto.

The second plating layer 144 may be formed on the other end portion of the capacitor body 110 to cover the second conductive resin layer 143.

In this case, the second plating layer 144 has a portion directly contacting a portion of the second conductive layer 141 in the upper or lower cover region 112 or 113 of the capacitor body 110.

In addition, the second plating layer 144 may be formed as a nickel (Ni) plating layer, and a fourth plating layer 145 may be further disposed on the second plating layer 144. In this case, the fourth plating layer 145 may be formed as a tin (Sn) plating layer.

The second conductive resin layer 143 may be disposed on the second conductive layer 141 on the other end portion of the capacitor body 110.

In this case, the second conductive resin layer 143 may not be formed in a region in which the fourth surface 4 and the first or second surface 1 or 2 of the capacitor body 110 are connected in the upper or lower cover region 112 or 113 of the capacitor body 110, to provide a non-formed portion. In the non-formed portion in which the second conductive resin layer 143 is not formed, a portion of the second conductive layer 141 may be in direct contact with the second plating layer 144.

With this structure, the second conductive resin layer 143 may include a 2-1 conductive resin layer 143a disposed on the second conductive layer 141, and a 2-2 conductive resin layer 143b disposed on portions of the first, second, fifth, and sixth surfaces 1, 2, 5, and 6 of the capacitor body 110. An opening (or a gap) may be provided between the 2-1 conductive resin layer 143a and the 2-2 conductive resin layer 143b, so that the second plating layer 144 may include a portion disposed in the opening of the second conductive resin layer 143 between the 2-1 conductive resin layer 143a and the 2-2 conductive resin layer 143b to be in contact with to the second conductive layer 141.

In addition, the second conductive resin layer 143 may include a plurality of metal particles, and a resin surrounding the plurality of metal particles and contacting the second conductive layer 141.

In this case, the metal particles may be made of an alloy of at least one or two or more of copper (Cu), silver (Ag), and tin (Sn), but the present disclosure is not limited thereto.

In addition, the metal particles may be formed to have a spherical shape or a flake shape, but the present disclosure is not limited thereto.

In addition, the resin may be one of polymer resins such as epoxy, acryl, or the like, but the present disclosure is not limited thereto.

In the present embodiment, in the external electrode, a portion of the conductive layer may be in direct contact with the plating layer to be connected to a circuit, to prevent an increase in equivalent series resistance (ESR) due to the conductive resin layer. In this case, since the conductive layer and the plating layer may be in direct contact with each other in the upper or lower cover region of the capacitor body in which the internal electrode is not present, deterioration of reliability may be prevented.

The first external electrode 130 may include a first connection portion disposed on the third surface 3 of the capacitor body 110, and a first band portion extending from the first connection portion toward portions of the first, second, fifth, and sixth surfaces 1, 2, 5, and 6 of the capacitor body 110.

The first connection portion may include a first conductive layer 131, a 1-1 conductive resin layer 133a disposed on the first conductive layer 131, and a 1-1 plating layer 134a disposed on the 1-1 conductive resin layer 133a.

In addition, the first band portion may include a 1-2 conductive resin layer 133b disposed on portions of the first, second, fifth, and sixth surfaces 1, 2, 5, and 6 of the capacitor body 110, and a 1-2 plating layer 134b extending from the 1-1 plating layer 134a to cover the 1-2 conductive resin layer 133b.

In this case, the third plating layer 135 may include a 3-1 plating layer 135a disposed on the 1-1 plating layer 134a and a 3-2 plating layer 135b disposed on the 1-2 plating layer 134b.

In addition, the second external electrode 140 may include a second connection portion disposed on the fourth surface 4 of the capacitor body 110, and a second band portion extending from the second connection portion toward portions of the first, second, fifth, and sixth surfaces 1, 2, 5, and 6 of the capacitor body 110.

The second connection portion may include a second conductive layer 141, a 2-1 conductive resin layer 143a disposed on the second conductive layer 141, and a 2-1 plating layer 144a disposed on the 2-1 conductive resin layer 143a.

In addition, the second band portion may include a 2-2 conductive resin layer 143b disposed on portions of the first, second, fifth, and sixth surfaces 1, 2, 5, and 6 of the capacitor body 110, and a 2-2 plating layer 144b extending from the 2-2 plating layer 144b to cover the 2-2 conductive resin layer 143b.

In this case, the fourth plating layer 145 may include a 4-1 plating layer 145a disposed on the 2-1 plating layer 144a and a 4-2 plating layer 145b disposed on the 2-2 plating layer 144b.

The first band portion may have a maximum thickness near a ½ point in the X direction, and the second band portion may have a maximum thickness near a ½ point in the X direction. In one example, a maximum thickness of a layer may refer to a maximum thickness of the layer in a cross-section such as an X-Z cross-section of the layer, although the present disclose is not limited to. The X-Z cross-section may be a cut through a central portion of the capacitor body in the Y direction, although the present disclose is not limited to. In one example, a scanning electron microscope (SEM) may be used to measure a thickness, although the present disclosure is not limited thereto. Other methods and/or tools appreciated by one of ordinary skill in the art, even if not described in the present disclosure, may also be used.

In addition, the first connection portion may have a maximum thickness near a ½ point in the Z direction, and the second connection portion may have a maximum thickness near a ½ point in the Z direction.

From this point of view, in the present embodiment, a maximum thickness of the 1-2 conductive resin layer 133b may be less than a sum of a maximum thickness of the 1-1 conductive resin layer 133a and a maximum thickness of the first conductive layer 131.

In addition, a maximum thickness of the 2-2 conductive resin layer 143b may be less than a sum of a maximum thickness of the 2-1 conductive resin layer 143a and a maximum thickness of the second conductive layer 141.

According to this configuration, thicknesses of the first and second conductive resin layers 133 and 143 may be minimized, and external stress applied to the first and second external electrodes 130 and 140 may be relieved, to improve flexural strength the multilayer capacitor 100.

If a portion between an internal electrode located in an uppermost portion and an internal electrode located in a lowermost portion on the third surface 3 of the capacitor body 110 is equally divided into four sections in the first direction, and boundary points of the four sections on the third surface of the capacitor body are defined as first to fifth points P1 to P5, a ratio of a thickness of the first conductive resin layer 133 relative to a thickness of the first conductive layer 131 may be 0.25 or less at the first and fifth points P1 and P5, respectively, 0.3 or less at the second and fourth points P2 and P4, respectively, and 0.35 or less at the third point P3.

In this case, the first conductive layer 131 of the first external electrode 130 may have an average thickness of 12 μm or less at the first and fifth points P1 and P5, and an average thickness of 15 μm or less at the second to fourth points P2 to P4.

In addition, if a portion between an internal electrode located in an uppermost portion and an internal electrode located in a lowermost portion on the fourth surface 4 of the capacitor body 110 is equally divided into four sections in the first direction, and boundary points of the four sections on the third surface of the capacitor body are defined as sixth to tenth points P6 to P10, a ratio of a thickness of the second conductive resin layer 143 relative to a thickness of the second conductive layer 141 may be 0.25 or less at the sixth and tenth points P6 and P10, respectively, 0.3 or less at the seventh and ninth points P7 and P9, respectively, and 0.35 or less at the eighth point P8.

In this case, the second conductive layer 141 of the second external electrode 140 may have an average thickness of 12 μm or less at the sixth and tenth points P6 and P10, and an average thickness of 15 μm or less at the seventh to ninth points P7 to P9.

Figure 5:
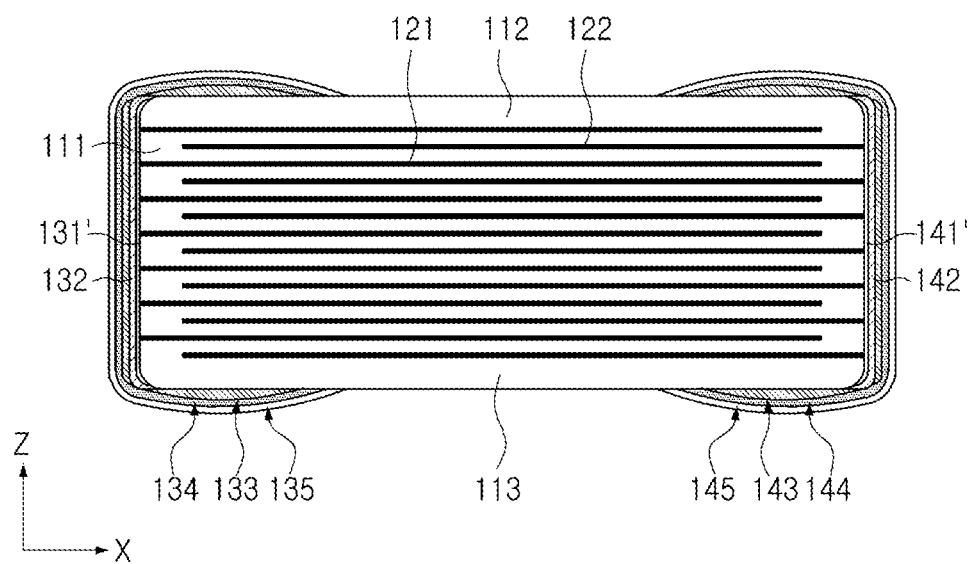
FIG. 5 is a cross-sectional view of a multilayer capacitor according to another embodiment of the present disclosure.

As illustrated in FIG. 5, a first conductive layer may include a first inner conductive layer 131' disposed on the third surface 3 of the capacitor body 110, and a first outer conductive layer 132 disposed on the first inner conductive layer 131'.

In this case, the first inner conductive layer 131' and the first outer conductive layer 132 may include the same metal, or may include different metals in some cases.

A second conductive layer may include a second inner conductive layer 141' disposed on the fourth surface 4 of the capacitor body 110, and a second outer conductive layer 142 disposed on the second inner conductive layer 141'.

In this case, the second inner conductive layer 141' and the second outer conductive layer 142 may include the same metal, or may include different metals in some cases.

When each of the first and second conductive layers is configured to have a two-layer structure as described above, an effect of protecting the capacitor body 110 from external impact may be improved, and effects such as a decrease in ESR, prevention of radiation cracks, improvement in high temperature reliability, and the like, due to electrical characteristics of the multilayer capacitor, may be further improved.

In a conventional multilayer capacitor, in order to ensure flexural strength, external electrodes including a primary electrode and a secondary electrode may be formed using two types of conductive pastes.

The primary electrode, making direct contact with an internal electrode to realize capacitance, may include conductive metals such as copper (Cu), nickel (Ni), or the like, and the secondary electrode may be formed on the primary electrode using a conductive paste containing a metal such as copper (Cu), silver (Ag), or the like, and a resin.

In addition, a length of a band portion of the primary electrode may be formed to be shorter than a length of a band portion of the secondary electrode, to entirely cover the band portion of the primary electrode by the band portion of the secondary electrode. In this case, resistance to external stress (bending) may result from the secondary electrode including the resin.

In order to guarantee flexural strength of the multilayer capacitor as described above, when the external electrodes are formed of the two types of conductive paste, thicknesses of the primary electrode and the secondary electrode may increase in all X, Y, and Z directions of a capacitor body. Therefore, there may be limitations in securing effective capacitance of the multilayer capacitor.

In addition, the secondary electrode including the resin introduced to guarantee flexural strength may serve as a gate, connected to a circuit through a plating layer and supplying electric charge to the multilayer capacitor, and, as compared to the primary electrode, may have poor electrical connection properties, and may act as a major cause of increasing ESR of the multilayer capacitor.

In addition, the multilayer capacitor in which the external electrodes are formed may be mounted on a PCB or the like by a reflow process, after plating, in order to be connected to a circuit.

This reflow process may be generally performed at a high temperature of 240° C. or higher, and may be performed several times, depending on configuration of a set. In this process, gas may be released from the secondary electrode including the resin, and in this process, peeling (lifting) may occur between the primary electrode and the secondary electrode.

Therefore, in order to implement a multilayer capacitor corresponding to a developing IT technology, it is necessary to form an external electrode for minimizing a thickness, guaranteeing flexural strength, and preventing side effects such as ESR, peeling (lifting), or the like.

In the external electrode of the conventional multilayer capacitor, a conductive layer, which may be the primary electrode, may be formed in a band portion, to increase the occurrence of bending cracks.

In the present disclosure, a conductive layer of an external electrode may be formed only on the third and fourth surfaces of a capacitor body and may not be formed on the first, second, fifth, and sixth surfaces of the capacitor body. Therefore, a thickness of a portion of the external electrode corresponding to a band portion may be minimized, and occurrence of bending cracks may be suppressed.

In addition, a conductive resin layer of the external electrode may be formed as thin as possible on the third and fourth surfaces of the capacitor body by making a conductive paste containing a resin and a metal as thin as possible, to secure a stacking space of internal electrodes as large as possible within a limited space.

Therefore, an effective capacitance of a multilayer capacitor in which an external electrode is formed of a conductive layer as a primary electrode and a conductive resin layer as a secondary electrode, and the conductive layer is formed only on the third and fourth surfaces of a capacitor body and is not formed on the first, second, fifth, and sixth surfaces of the capacitor body may be improved to a level of 8 to 10%, as compared to a conventional multilayer capacitor in which a conductive layer as a primary electrode and a conductive resin layer as a secondary electrode are both formed on the first, second, third, fourth, fifth, and sixth surfaces.

In addition, due to a structure of the external electrode including the conductive layer and the conductive resin layer, configured as described above, in the present embodiment, a portion of the conductive layer in an upper cover region or a lower cover region of the capacitor body may be exposed outside the conductive resin layer, to be directly connected to a plating layer.

Therefore, an increase in ESR of the multilayer capacitor may be prevented, and the ESR of the multilayer capacitor may be reduced by 50% or more, compared to a multilayer capacitor having a structure in which a conductive layer of the existing external electrode is formed up to a band portion and the conductive layer and the plating layer are not directly connected to each other.

In addition, a structure of the external electrode according to the present embodiment may minimizes an amount of gas emitted from the conductive resin layer during reflow, to prevent an interfacial peeling (lifting) phenomenon of the external electrode. According to the present embodiment, even after 5 reflows, no peeling (lifting) phenomenon may occur at an interface between the conductive layer and the conductive resin layer.

When a thickness of the conductive resin layer is too thin, reliability of the multilayer capacitor may be deteriorated due to penetration of a plating solution or the like. Therefore, the thickness of the conductive resin layer may be adjusted to prevent such a deterioration in reliability.

In FIG. 3, if a portion between an internal electrode located in an uppermost portion and an internal electrode located in a lowermost portion on the third surface of the capacitor body is equally divided into four sections in the Z direction, and boundary points of the four sections on the third surface of the capacitor body are defined as first to fifth points P1 to P5, and if a portion between an internal electrode located in an uppermost portion and an internal electrode located in a lowermost portion on the fourth surface of the capacitor body is equally divided into four sections in the Z direction, and boundary points of the four sections on the third surface of the capacitor body are defined as sixth to tenth points P6 to P10.

Table 1 below illustrates ratios of thicknesses of first conductive resin layers to thicknesses of first conductive layers at the first to fifth points.

The thicknesses of the first conductive layers and the thicknesses of the first conductive resin layers were measured by preparing ten multilayer capacitors to expose a third surface of a capacitor body in the X-Z directions, and measuring the thicknesses of the first conductive layers and the thicknesses of the first conductive resin layers in first external electrodes at first to fifth points of each of the prepared samples (multilayer capacitors) by SEM. In this case, measurement magnification of the first conductive layers and the first conductive resin layers of the first external electrodes at each of the points was 3,000 times.

Since a first external electrode is electrically connected to a first internal electrode and a second external electrode is electrically connected to a second internal electrode, configurations of the first external electrode and the second external electrode may be generally similar. Therefore, a ratio (value) of a thickness of a second conductive resin layer to a thickness of a second conductive layer at the sixth to tenth points may be considered to correspond to the first to fifth points, respectively.

TABLE 1

| # | Ratio (%) of Thickness of Conductive Resin Layer to Thickness of Conductive Layer by Each Point | | | | | ESR (MΩ) |
|---|---|---|---|---|---|---|
| | $1^{st}$ Point | $2^{nd}$ Point | $3^{rd}$ Point | $4^{th}$ Point | $5^{th}$ Point | |
| 1 | 18 | 21 | 25 | 20 | 17 | 6.5 |
| 2 | 20 | 23 | 28 | 21 | 17 | 6.8 |
| 3 | 20 | 24 | 31 | 27 | 23 | 7.2 |
| 4 | 25 | 29 | 35 | 30 | 24 | 15.8 |
| 5 | 28 | 33 | 42 | 32 | 28 | 48.2 |
| 6 | 33 | 39 | 45 | 37 | 32 | 54.6 |
| 7 | 32 | 40 | 48 | 41 | 33 | 62.7 |
| 8 | 36 | 44 | 55 | 40 | 30 | 80.1 |
| 9 | 40 | 47 | 59 | 47 | 42 | 105.2 |
| 10 | 42 | 50 | 64 | 51 | 45 | 123.9 |

In the present embodiment, ratios of thicknesses of first conductive resin layers to thicknesses of first conductive layers may be 0.25 or less at the first and fifth points, 0.3 or less at the second and fourth points, and 0.35 or less at the third point.

Referring to Table 1, it can be seen that, in #4 in which ratios of thicknesses of first conductive resin layers to thicknesses of first conductive layers are close to the above preferred threshold values, ESRs thereof increased by about 2 times, compared to #1 to #3, and in #5 to 10 in which ratios of thicknesses of first conductive resin layers to thicknesses of first conductive layers do not satisfy the above preferred threshold values, compared to the thickness of, ESRs thereof significantly increased by 3 times or more, compared to #4.

For example, when a ratio of a thickness of a conductive resin layer to a thickness of a conductive layer does not satisfy the conditions of the present disclosure, there may be problems that ESR of the multilayer capacitor increase and reliability deteriorates due to penetration of the plating solution.

In this case, an average thickness of the first conductive layer at the first and fifth points may be 12 μm or less, an average thickness of the first conductive layer at the second and fourth points may be 15 μm or less, and an average thickness of the first conductive layer at the third point may be 15 μm or less. The second conductive layer may have the same characteristics as the first conductive layer.

In this case, average thicknesses of the first and second conductive layers at each of the points may be averaged by measuring the thicknesses of the first and second conductive layers for the ten multilayer capacitors, samples, as illustrated in Table 1 above.

When the thicknesses of the first and second conductive layers do not satisfy the above conditions, a stacking space of internal electrodes may not be further secured within a limited space. Therefore, there may be a problem that effective capacitance of the multilayer capacitor is reduced.

As in the present embodiment, when the conductive resin layer is formed as thin as possible in order to prevent an increase in size of the multilayer capacitor due to the conductive resin layer, external stress may be relieved, to secure flexural strength of the multilayer capacitor.

In this case, in order to more effectively prevent an increase in ESR, a thickness of the band portion at an intermediate point on the first or second surface of the conductive resin layer in the X direction may be thinner than a total thickness of the conductive layer and the conductive resin layer at an intermediate point on the third or fourth surface of the conductive resin layer in the Z direction.

TABLE 2

| | Ratio (%) of Thickness of First Conductive Resin Layer at ½ Point of First Band portion/Thickness of Center | ESR (MΩ) |
|---|---|---|
| 1 | 81 | 6.8 |
| 2 | 93 | 7.2 |
| 3 | 102 | 15.8 |
| 4 | 105 | 48.2 |
| 5 | 109 | 54.6 |

In Table 2, the thickness of center means a sum of a thickness of the first conductive layer and a thickness of the first conductive resin layer at a ½ point in the Z direction on the third surface of the capacitor body.

In this case, the thicknesses of the first conductive resin layers in the first band portions were measured by preparing chips in the X-Z directions to expose the chips at a ½ point in the Y direction, and measuring thicknesses of the first conductive resin layers at a point ½ of a length of the first band portion in the X direction in the prepared chips. In this case, measurement magnification thereof was 3,000 times.

Referring to Table 2, it can be seen that, in #3 to 5 in which a thickness of the first conductive resin layer at a point ½ in the X direction on the first or second surface of the first conductive resin layer is thicker than a sum of a thickness of the first conductive layer and a thickness of the first conductive resin layer at ½ point in the Z direction on the third surface of the capacitor body, ESRs thereof greatly increased by two or more times, compared to #2.

Since a first external electrode is electrically connected to a first internal electrode and a second external electrode is electrically connected to a second internal electrode, configurations of the first external electrode and the second external electrode may be generally similar. Therefore, the above description may be considered to include a description regarding a ratio of a thickness of a second conductive resin layer at the ½ point of a length of a second band portion to a thickness of a center in the external electrode.

According to an embodiment of the present disclosure, a thickness of a multilayer capacitor may be reduced and flexural strength of the multilayer capacitor may be guaranteed.

While example embodiments have been illustrated and described above, it will be apparent to those skilled in the art that modifications and variations could be made without departing from the scope of the present disclosure as defined by the appended claims.

What is claimed is:

1. A multilayer capacitor comprising:
a capacitor body including a dielectric layer, first and second internal electrodes, and including a first surface and a second surface, opposing each other in a first direction, a third surface and a fourth surface, opposing each other in a second direction different from the first direction, and a fifth surface and a sixth surface, opposing each other in a third direction different from the first direction; and
first and second external electrodes disposed on the third and the fourth surfaces of the capacitor body in the second direction, respectively, and connected to the first and second internal electrodes, respectively,
wherein the first external electrode comprises a first conductive layer disposed on the third surface of the capacitor body to be connected to the first internal electrode, and a first conductive resin layer covering the first conductive layer and disposed on portions of the first, second, fifth, and sixth surfaces of the capacitor body,
wherein the second external electrode comprises a second conductive layer disposed on the fourth surface of the capacitor body to be connected to the second internal electrode, and a second conductive resin layer covering the second conductive layer and disposed on portions of the first, second, fifth, and sixth surfaces of the capacitor body, and
a portion of the third surface of the capacitor body between an internal electrode located in an uppermost portion of the capacitor body and an internal electrode located in a lowermost portion of the capacitor body is equally divided into four sections in the first direction, first to fifth points are each boundary points of the four sections on the third surface of the capacitor body, and, a ratio of a thickness of the first conductive resin layer relative to a thickness of the first conductive layer is 0.25 or less at the first and fifth points, respectively, 0.3 or less at the second and fourth points, respectively, and 0.35 or less at the third point,
wherein the first conductive layer of the first external electrode has an average thickness of 12 μm or less at the first and fifth points, and an average thickness of 15 μm or less at the second to fourth points,
wherein, a portion of the fourth surface of the capacitor body between an internal electrode located in an uppermost portion of the capacitor body and an internal electrode located in a lowermost portion of the capacitor body is equally divided into four sections in the first direction, sixth to tenth points are each boundary points of the four sections on the fourth surface of the capacitor body, and, a ratio of a thickness of the second conductive resin layer relative to a thickness of the second conductive layer is 0.25 or less at the sixth and tenth points, respectively, 0.3 or less at the seventh and ninth points, respectively, and 0.35 or less at the eighth point,
wherein the second conductive layer of the second external electrode has an average thickness of 12 μm or less at the sixth and tenth points, and an average thickness of 15 μm or less at the seventh to ninth points; wherein a thickness ratio of the first conductive resin layer at a point ½ in the X direction on a first or a second surface of the first conductive resin layer is greater than the sum of the thickness of the first conductive layer and the thickness of the first conductive resin layer at the ½ point in the Z direction on the third surface of the capacitor body, whereby an ESR increases by two or more times.

2. The multilayer capacitor of claim 1, further comprising a first plating layer and a second plating layer disposed on the first and second conductive resin layers, respectively.

3. The multilayer capacitor of claim 2, wherein the first conductive layer and the first plating layer are in contact with each other, on a portion of the capacitor body to which the third surface and the first or second surface are connected, and
the second conductive layer and the second plating layer are in contact with each other, on a portion of the capacitor body to which the fourth surface and the first or second surface are connected.

4. The multilayer capacitor of claim 2, wherein the first conductive resin layer includes a 1-1 conductive resin layer and a 1-2 conductive resin layer, the second conductive resin layer includes a 2-1 conductive resin layer and a 2-2 conductive resin layer, the first plating layer includes a 1-1 plating layer and a 1-2 plating layer, and the second plating layer includes a 2-1 plating layer and a 2-2 plating layer,
the first external electrode comprises a first connection portion disposed on the third surface of the capacitor body, and a first band portion extending from the first connection portion toward portions of the first, second, fifth, and sixth surfaces of the capacitor body, and
the first connection portion comprises the first conductive layer, the 1-1 conductive resin layer disposed on the first conductive layer, and the 1-1 plating layer disposed on the 1-1 conductive resin layer,
wherein the first band portion comprises the 1-2 conductive resin layer disposed on portions of the first, second, fifth, and sixth surfaces of the capacitor body, and the 1-2 plating layer extending from the 1-1 plating layer to cover the 1-2 conductive resin layer, and
the second external electrode comprises a second connection portion disposed on the fourth surface of the capacitor body, and a second band portion extending from the second connection portion toward portions of the first, second, fifth, and sixth surfaces of the capacitor body, and
the second connection portion comprises the second conductive layer, the 2-1 conductive resin layer disposed on the second conductive layer, and the 2-1 plating layer disposed on the 2-1 conductive resin layer,
wherein the second band portion comprises the 2-2 conductive resin layer disposed on portions of the first, second, fifth, and sixth surfaces of the capacitor body, and the 2-2 plating layer extending from the 2-1 plating layer to cover the 2-2 conductive resin layer.

5. The multilayer capacitor of claim 4, wherein a maximum thickness of the 1-2 conductive resin layer is less than a sum of a maximum thickness of the 1-1 conductive resin layer and a maximum thickness of the first conductive layer, and
a maximum thickness of the 2-2 conductive resin layer is less than a sum of a maximum thickness of the 2-1 conductive resin layer and a maximum thickness of the second conductive layer.

6. The multilayer capacitor of claim 2, wherein the first and second plating layers are a nickel (Ni) plating layer, and the first and second external electrodes further comprises a third plating layer and a fourth plating layer respectively disposed on the first and second plating layers, respectively and provided as a tin (Sn) plating layer.

7. The multilayer capacitor of claim 1, wherein the first conductive layer comprises a first inner conductive layer disposed on the third surface of the capacitor body, and a first outer conductive layer disposed on the first inner conductive layer, and
the second conductive layer comprises a second inner conductive layer disposed on the fourth surface of the capacitor body, and a second outer conductive layer disposed on the second inner conductive layer.

8. The multilayer capacitor of claim 7, wherein, in the first conductive layer, a metal component included in the first inner conductive layer is different from a metal component included in the first outer conductive layer, and
in the second conductive layer, a metal component included in the second inner conductive layer is different from a metal component included in the second outer conductive layer.

9. The multilayer capacitor of claim 1, wherein the first and second conductive layers comprise at least one of copper (Cu), nickel (Ni), tin (Sn), or silver (Ag).

10. The multilayer capacitor of claim 1, wherein the first and second conductive resin layers comprise a metal particle and a resin.

11. A multilayer capacitor comprising:
a capacitor body including an active region having a dielectric layer and first and second internal electrodes, and an upper cover region and a lower cover region respectively disposed above and below the active region; and
first and second external electrodes connected to the first and second internal electrodes, respectively,
wherein the first external electrode comprises:
a first conductive layer disposed on an end surface of the capacitor body to cover an end of the first internal electrode;
a first conductive resin layer including a first portion disposed on the first conductive layer and a second portion disposed on a side surface of the capacitor body; and
a first plating layer including a third portion disposed on the first portion of the first conductive resin layer and a fourth portion disposed on the second portion of the first conductive resin layer,
wherein the first plating layer has a portion disposed in an opening of the first conductive resin layer between the first and second portions of the first conductive resin layer to connect to the first conductive layer,
wherein the first conductive layer of the first external electrode has an average thickness of 12 μm or less at the first and fifth points, and an average thickness of 15 μm or less at the second to fourth points,
wherein, a portion of the fourth surface of the capacitor body between an internal electrode located in an uppermost portion of the capacitor body and an internal electrode located in a lowermost portion of the capacitor body is equally divided into four sections in the first direction, sixth to tenth points are each boundary points of the four sections on the fourth surface of the capacitor body, and, a ratio of a thickness of the second conductive resin layer relative to a thickness of the second conductive layer is 0.25 or less at the sixth and tenth points, respectively, 0.3 or less at the seventh and ninth points, respectively, and 0.35 or less at the eighth point,
wherein the second conductive layer of the second external electrode has an average thickness of 12 μm or less at the sixth and tenth points, and an average thickness of 15 μm or less at the seventh to ninth points, wherein a thickness ratio of the first conductive resin layer at a point ½ in the X direction on a first or a second surface of the first conductive resin layer is greater than the sum of the thickness of the first conductive layer and the thickness of the first conductive resin layer at the ½ point in the Z direction on a third surface of the capacitor body.

12. The multilayer capacitor of claim 11, wherein a portion of the first conductive layer in contact with one of the upper cover region and the lower cover region is also in contact with the portion of the first plating layer disposed in the opening of the first conductive resin layer.

13. The multilayer capacitor of claim 11, wherein the first conductive layer comprises:
a first inner conductive layer disposed on the end surface of the capacitor body to be in contact with the end of the first internal electrode; and
a first outer conductive layer disposed between the first inner conductive layer and the first portion of the first conductive resin layer.

14. The multilayer capacitor of claim 11, wherein a maximum thickness of the second portion of the conductive resin layer is less than a sum of a maximum thickness of the first portion of the first conductive resin layer and a maximum thickness of the first conductive layer.

15. The multilayer capacitor of claim 11, wherein the first plating layer includes nickel (Ni), and
the first external electrode further comprises a tin plating layer disposed on the first plating layer.

16. A multilayer capacitor comprising:
a capacitor body including an active region having a dielectric layer, and first and second internal electrodes, and an upper cover region and a lower cover region respectively disposed above and below the active region, and including a first surface and a second surface, opposing each other in a first direction, a third surface and a fourth surface, opposing each other in a second direction different from the first direction, and a fifth surface and a sixth surface, opposing each other in a third direction different from the first direction; and
first and second external electrodes disposed on the third and fourth surfaces, respectively, and connected to the first and second internal electrodes, respectively,
wherein the first external electrode comprises:
a first conductive layer disposed on the third surface of the capacitor body to cover an end of the first internal electrode; and
a first conductive resin layer including a first portion disposed on the first conducive layer and a second portion disposed on at least one of the first and second surfaces of the capacitor body,
wherein a thickness of the second portion of the first conductive resin layer at an intermediate point on the one of the first and second surfaces in the second direction is less than a total thickness of the first conductive layer and the first portion of the first conductive resin layer at an intermediate point on the third surface in the first direction, to ensure a robust electrical connection, and at the intermediate point on the third surface in the first direction, a thickness of the first conductive layer is greater than a thickness of the first portion of the first conductive resin layer, which allows for greater mechanical flexibility, and reducing the stress on the capacitor during thermal cycling, wherein the second conductive layer of the second external electrode has an average thickness of 12 μm or less at the sixth and tenth points, and an average thickness of 15 μm or less at the seventh to ninth points, wherein a thickness ratio of the first conductive resin layer at a point ½ in the X direction on the first or second surface of the first conductive resin layer is greater than the sum of the thickness of the first conductive layer and the thickness of the first conductive resin layer at the ½ point in the Z direction on the third surface of the capacitor body, whereby an ESR increases by two or more times.

17. The multilayer capacitor of claim 16, wherein the first external electrode further comprises: a first plating layer including a third portion disposed on the first portion of the first conductive resin layer and a fourth portion disposed on the second portion of the first conductive resin layer.

18. The multilayer capacitor of claim 16, wherein the first conductive layer comprises:
- a first inner conductive layer disposed on the end surface of the capacitor body to be in contact with the end of the first internal electrode; and
- a first outer conductive layer disposed between the first inner conductive layer and the first portion of the first conductive resin layer.

* * * * *